United States Patent
Lee et al.

(10) Patent No.: US 9,853,686 B2
(45) Date of Patent: Dec. 26, 2017

(54) VECTOR MODULATOR AND TRANSCEIVER INCLUDING THE SAME

(71) Applicant: PHYCHIPS Inc., Daejeon (KR)

(72) Inventors: Sang-Sung Lee, Ansan-si (KR); Kyoung Seok Park, Seongnam-si (KR)

(73) Assignee: PHYCHIPS Inc., Daejeon (KR)

( * ) Notice: Subject to any disclaimer, the term of this patent is extended or adjusted under 35 U.S.C. 154(b) by 0 days.

(21) Appl. No.: 14/691,996

(22) Filed: Apr. 21, 2015

(65) Prior Publication Data
US 2015/0303983 A1   Oct. 22, 2015

(30) Foreign Application Priority Data

Apr. 22, 2014 (KR) .................. 10-2014-0048212

(51) Int. Cl.
*H04B 1/52* (2015.01)
*H04B 1/525* (2015.01)

(52) U.S. Cl.
CPC .................. *H04B 1/525* (2013.01)

(58) Field of Classification Search
CPC .... H04B 1/525; H04B 5/0056; H04B 1/1676; H04B 1/18; H04B 1/38; H04B 10/50577; H04B 10/50597
See application file for complete search history.

(56) References Cited

U.S. PATENT DOCUMENTS

| | | | | |
|---|---|---|---|---|
| 4,224,564 A * | 9/1980 | Dobkin | .............. | H03M 1/785 307/109 |
| 6,937,179 B1 * | 8/2005 | Martin | .............. | H03H 7/25 341/144 |
| 7,276,962 B1 * | 10/2007 | Tomasi | .............. | H03F 1/3211 330/254 |
| 2008/0227409 A1 * | 9/2008 | Chang | .............. | H04B 1/525 455/78 |
| 2011/0300817 A1 * | 12/2011 | Jung | .............. | H04B 1/525 455/114.2 |
| 2014/0269864 A1 * | 9/2014 | Aparin | .............. | H04B 1/40 375/221 |
| 2015/0084688 A1 * | 3/2015 | Chang | .............. | H03H 11/0466 327/555 |

FOREIGN PATENT DOCUMENTS

| | | |
|---|---|---|
| KR | 10-2011-0069585 | 6/2011 |
| KR | 10-2011-0132815 | 12/2011 |

OTHER PUBLICATIONS

Mikehemar et al. "An on-chip wideband and low-loss duplexer for 3G/4G CMOS radios", 2010 IEEE Symposium on VLSI Circuits (VLSIC), pp. 129-130.*
Mikhemar, Mohyee, Houshang Darabi, and A. Abidi. "A tunable integrated duplexer with 50dB isolation in 40nm CMOS." In 2009 IEEE International Solid-State Circuits Conference-Digest of Technical Papers, pp. 386-387. IEEE, 2009.*
Korean Office Action mailed Jan. 13, 2016 in related Korean application No. 10-2014-0048212 (5 pgs.).

* cited by examiner

*Primary Examiner* — Ankur Jain
*Assistant Examiner* — Zhitong Chen
(74) *Attorney, Agent, or Firm* — Foley & Lardner LLP

(57) ABSTRACT

A vector modulator of a transceiver may be provided that includes: a variable resistor having one end to which an input signal is transmitted; a variable capacitor which is connected in parallel to the variable resistor and has one end to which the input signal is transmitted; and a summing circuit which sums a signal of the other end of the variable resistor and a signal of the other of the variable capacitor.

13 Claims, 6 Drawing Sheets

VECTOR MODULATOR AND TRANSCEIVER INCLUDING THE SAME

BACKGROUND

Field

The present invention relates to a wireless communication, and more particularly to a vector modulator and a transceiver including the same in the wireless communication system.

Description of Related Art

A system in which a transmitter and a receiver are simultaneously turned on has a problem that a signal from the transmitter is input to the receiver, so that receive sensitivity is degraded. An example of such a system can include a radio-frequency identification (RFID) transceiver in which the transmitter and receiver share an antenna. The RFID technology refers to a technology of wirelessly bringing information of an RFID tag to an RFID recognizer.

In general, a passive RFID tag has no separate power for driving itself. Therefore, the RFID transceiver transmits continuously an RF continuous wave (CW) signal from the transmitter of the RFID transceiver in order to supply energy to the passive RFID tag. Simultaneously with this, the receiver included in the RFID transceiver receives data from the RFID tag. By doing this, a part of the output signal of the transmitter of the RFID transceiver is input to the receiver as a leakage signal, so that the receive sensitivity of the receiver is degraded.

The following methods for removing a transmitter leakage signal which is input to the receiver of the RFID transceiver have been being applied. 1) A method is applied which uses two orthogonally disposed antennas to the transmitter and receiver respectively of the RFID transceiver. However, this method requires high cost and the size of the RFID transceiver becomes larger. 2) A method is applied in which the transmitter and receiver of the RFID transceiver share one antenna and a circulator or an isolation device like a directional coupler is used between the transmitter and the receiver. However, in spite of the use of the isolation device, due to the finite isolation rate (20~30 dB) of the isolation device and the change of the reflection ratio of the antenna, which changes according to the external environment, the amplitude of the transmitter leakage signal which is input to the input terminal of the receiver is generally larger than 0 dBm. Therefore, the receive sensitivity of the RFID transceiver is still degraded.

Figure 1A:
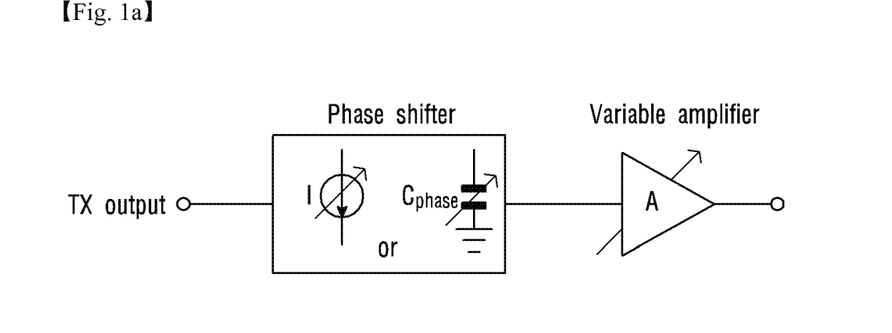
FIGS. 1a to 1d show conventional various structures for removing a transmitter leakage signal.
Figure 1B:
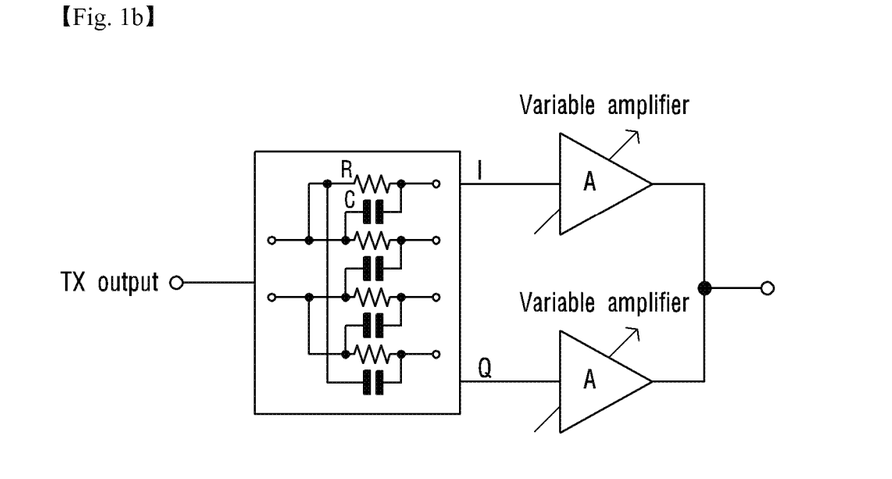
Figure 1C:
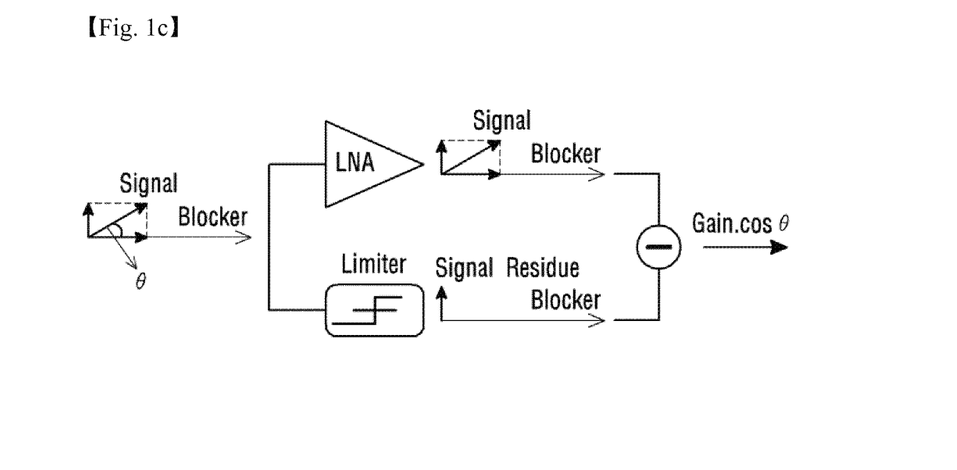
Figure 1D:
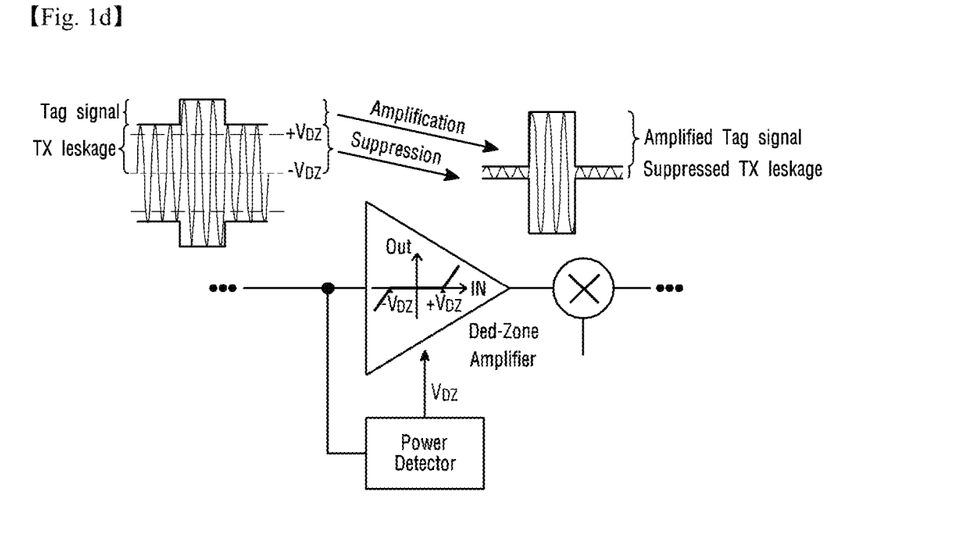

There is a demand not only for the above-described method for increasing the rate at which the transmitter is isolated from the receiver outside the transceiver chip, but also for a method for additionally removing the transmitter leakage signal inside the transceiver chip. The following technologies have been applied to the method for additionally removing the transmitter leakage signal. 1) It is possible to use a phase modulator which adjusts the phase of the output signal of the transmitter by using a phase shifter and controls the amplitude of the phase-adjusted signal by using a variable amplifier, thereby outputting a signal capable of offsetting the transmitter leakage signal which is input to the receiver. The phase modulator uses, as shown in FIG. 1a, the phase shifter which adjusts the phase of the transmitting signal and the variable amplifier which controls the amplitude of the transmitting signal are used. Here, it can be considered that the order of the phase shifter and the variable amplifier is reversed. Generally, the phase shifter can adjust the phase by adjusting a signal delay through the control of the current or through the control of the magnitude of a capacitor. 2) It is possible to use a vector modulator which obtains two signals having a 90 degree phase difference from each other by using the output signal of the transmitter and then controls the amplitude of each signal and sums the signals, thereby outputting a signal capable of offsetting the transmitter leakage signal which is input to the receiver. A typical vector modulator uses, as shown in FIG. 1b, an RC-CR circuit and a polyphase filter for generating two orthogonal signals, and the variable amplifier for controlling the amplitude of the signal. 3) It is possible to use an active blocker rejection method which clamps the signal which is input to the receiver, and thus, extracts the component of the transmitter leakage signal from the input signal, so that the transmitter leakage signal is removed from the input signal. Since the active blocker rejection method extracts, as shown in FIG. 1c, the component of the transmitting signal leaked from a clamping circuit (limiter) connected in parallel with a low-noise amplifier (LNA), there is little phase difference between the extracted transmission leakage signal and the transmission leakage signal which is input to the receiver. Therefore, it is possible to remove the leaked transmitting signal only by controlling the amplitude of the signal without additionally adjusting the phase. However, a part which controls the amplitude of a replica signal through the clamping circuit consumes much current. According to the relative phase difference between a tag signal and the leakage signal, a part of the tag signal, together with the leakage signal, is removed, so that noise figure characteristic may be deteriorated. 4) It is possible to use a method for removing the transmitter leakage signal by amplifying only the envelope of the signal which is input to the receiver through use of a property in which a Metal-Oxide-Semiconductor Field-Effect Transistor (MOSFET) is on/off controlled according to a threshold voltage Vth. This method consumes relatively small current because the amplifier is, as shown in FIG. 1d, turned on and operated on only the envelope of the receiver input signal including the tag signal and the transmitter leakage signal. However, since a part of the tag signal is removed according to the relative phase difference between the tag signal and the leaked transmitting signal, the noise figure characteristic is deteriorated due to the phase difference.

As described above, the existing method for removing the additional transmitter leakage signal has a problem of its own and includes an active device like a polar phase and/or amplifier. Therefore, there occur various problems including large currency consumption due to the use of the active device. Accordingly, there is a demand for a method which has a simple structure and minimized power consumption and removes the transmitter leakage signal by means of RFID transceiver.

SUMMARY

One embodiment is a vector modulator of a transceiver that includes: a variable resistor having one end to which an input signal is transmitted; a variable capacitor which is connected in parallel to the variable resistor and has one end to which the input signal is transmitted; and a summing circuit which sums a signal of the other end of the variable resistor and a signal of the other of the variable capacitor.

Another embodiment is a transceiver that includes: a transmitter which generates a transmitting signal; a receiver which receives a data signal through an antenna; and a vector modulator which not only receives the transmitting signal and generates a first signal and a second signal, which have a 90 degree phase difference, but also controls the amplitudes of the first and second signals, and then outputs a signal for offsetting a leakage signal of the transmitting signal, which is input to the receiver.

DETAILED DESCRIPTION

Hereafter, an exemplary embodiment of the present invention will be described in detail with reference to the accompanying drawings. It is noted that the same reference numerals are used to denote the same elements throughout the drawings. In the following description of the present invention, the detailed description of known functions and configurations incorporated herein is omitted when it may make the subject matter of the present invention unclear.

Figure 2:
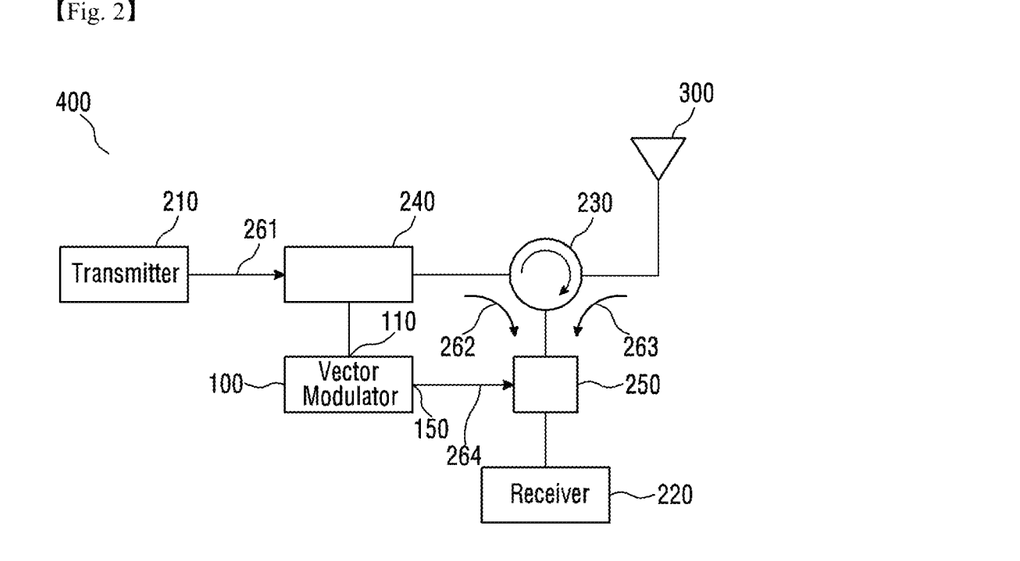
FIG. 2 shows a structure of a transceiver including a vector modulator according to an embodiment of the present invention.

FIG. 2 shows a structure of a transceiver 400 including a vector modulator 100 according to an embodiment of the present invention. The transceiver 400 including the vector modulator 100 according to the embodiment of the present invention may include a transmitter 210, a receiver 220, and an antenna 300. The transceiver 400 according to the embodiment of the present invention may include the vector modulator 100. Also, the transceiver 400 according to the embodiment of the present invention may include a circulator 230 which corresponds to an isolation device capable of primarily removing a leakage signal of the transmitter 210. However, this is just an example. Another isolation device can be also used.

The transmitter 210 and the receiver 220 of the transceiver 400 according to the embodiment of the present invention are simultaneously turned on, so that a transmitting signal of the transmitter 210 may leak to the receiver 220. For example, the transmitter 210 and the receiver 220 of the transceiver 400 according to the embodiment of the present invention may share one antenna 300, and the transceiver 400 may be an RFID transceiver. Also, the transmitter 210 and the receiver 220 of the transceiver 400 according to the embodiment of the present invention may use separate antennas. That is, the transmitter 210 and the receiver 220 of the transceiver 400 include separate antennas respectively. When the transmitting signal is leaked and is input to the receiver, the configuration and method for removing the leakage signal in accordance with the embodiment of the present invention can be applied. For example, also, when two antennas are used, a part of the transmitting signal of the transmitter 210 may be leaked and input to the receiver 220 by the coupling through a board or by a finite isolation rate of the orthogonal antenna. Hereafter, the transceiver 400 in which the transmitter 210 and receiver 220 share one antenna 300 will be described as an example with reference to FIG. 2.

In the transceiver 400 according to the embodiment of the present invention, the transmitter 210 may convert a baseband signal into an RF transmission signal (TX signal) and transmit to the outside through the antenna 300. The receiver 220 may receive an external signal incoming through the antenna 300, for example, a data signal from an RFID tag. The circulator 230 may partially block the leakage signal of the transmitting signal from being input to the signal which is input to the receiver 220 through the antenna 300. Generally, the isolation device like the circulator 230 has a finite isolation rate. Therefore, it is not easy to 100 percent block the input of the transmission leakage signal through the isolation device.

The transceiver 400 according to the embodiment of the present invention may include the vector modulator 100. As shown in FIG. 2, a part of the transmitting signal 261 may be input to the vector modulator 100 through a coupler 240 connected to the transmitter 210. Also, due to a finite reflection coefficient of the antenna 300, the transmitting signal 261 of the transmitter 210 may be reflected by the antenna 300 and input to the receiver 220. An output signal 264 of the vector modulator 100 according to the embodiment of the present invention may have an amplitude and phase which is capable of offsetting the transmission leakage signal including a leakage signal 262 which is leaked from the isolation device 230 (e.g., circulator) and is input to the receiver 220 and including a leakage signal 263 which is reflected by the antenna 300 and is input, together with a reception signal, to the receiver 220. The output signal 264, i.e., an offset signal, is provided to another coupler 250, so that the transmission leakage signals 262 and 263 can be removed in the signal which is input to the receiver 220. Here, the coupler 250 may have a concept which includes an adder and a subtractor. Accordingly, after the transmission leakage signals 262 and 263 are removed, the reception signal including the data may be transmitted to the receiver 220 through the antenna 300.

Figure 3:
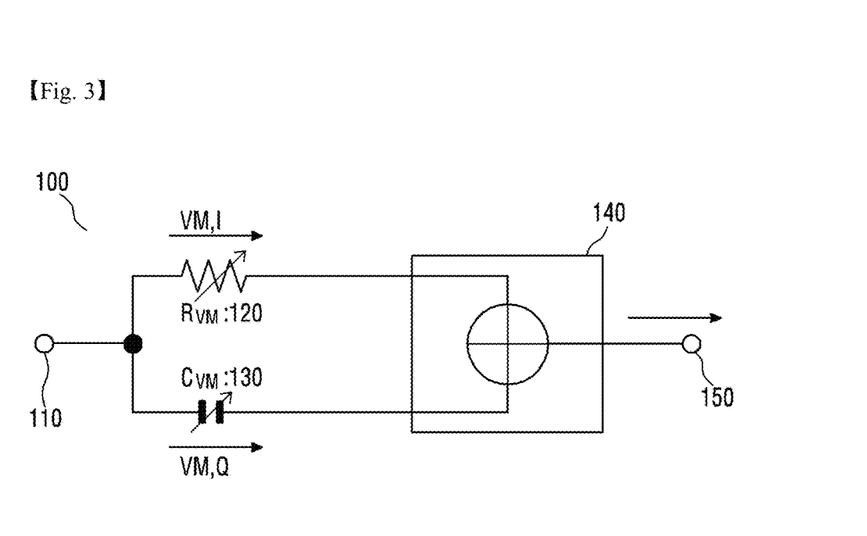
FIG. 3 is a view showing the vector modulator according to the embodiment of the present invention.

FIG. 3 is a view showing the vector modulator 100 according to the embodiment of the present invention. The vector modulator 100 according to the embodiment of the present invention may include a variable resistor 120, a variable capacitor 130 connected in parallel to the variable resistor 120, and a summing circuit 140 which receives a pass signal of the variable resistor 120 and a pass signal of the variable capacitor 130 and sums the pass signals.

An input signal may be transmitted to the vector modulator 100 through an input terminal 110 of the vector modulator 100. Here, the input signal may be the transmitting signal from the transmitter 210 of the transceiver 400 according to the embodiment of the present invention. The input signal through the input terminal 110 may be transmitted to an end of the variable resistor 120. Likewise, the input signal through the input terminal 110 may be transmitted to an end of the variable capacitor 130.

The other end of the variable resistor 120 and the other end of the variable capacitor 130 are connected to the summing circuit 140 respectively. Therefore, a first signal (VM, I), i.e., the input signal which has passed through the variable resistor 120 and a second signal (VM, Q), i.e., the input signal has passed through the variable capacitor 130 may be transmitted to the summing circuit 140 respectively. The summing circuit 140 sums the two signals, thereby transmitting an output signal capable of offsetting the leakage signal of the transmitter 210 to the receiver 220 through an output terminal 150. For example, as shown in FIG. 2, the output signal of the summing circuit 140 may be used such that the coupler 250 removes the transmission leakage signals 262 and 263.

The vector modulator 100 according to the embodiment of the present invention may be configured in such a manner as to generate a replica signal of the transmission leakage signal of the transmitter 210. Here, the replica signal may have the same amplitude as that of the transmission leakage signal and may have a phase the same as or a reverse to that of the transmission leakage signal. Here, the sign of the phase may be changed depending on whether the coupler 250 is the adder or subtractor. Two orthogonal vector signals having a 90 degree phase difference from each other may be generated while the signal which is input to the input terminal 110 of the vector modulator 100 passes through the variable resistor 120 and the variable capacitor 130 respectively. Here, the values of the variable resistor 120 and the variable capacitor 130 are controlled respectively, so that the amplitudes of the two vector signals can be simultaneously controlled.

More specifically, as shown in FIG. 3, the first signal (VM, I) obtained after the signal input to the vector modulator 100 passes through the variable resistor 120 may have the same phase as that of a signal $V_{TX}$ which is input to the vector modulator 100 and may be in the form of a voltage or a current. When the first signal (VM, I) is in the form of a current, it can be represented that $I_{VM,I}=V_{TX}/R_{VM}$. $V_{TX}$ may be a voltage signal as the transmitting signal of the transmitter 210. The second signal (VM, Q) obtained after the signal input to the vector modulator 100 passes through the variable capacitor 130 may have a 90 degree phase difference from that of the signal $V_{TX}$ which is input to the vector modulator 100 and may be in the form of a voltage or a current. When the second signal (VM, Q) is in the form of a current, it can be represented that $I_{VM,Q}=V_{TX}\times j\omega C_{VM}$. Accordingly, the signal (VM, I) which has passed through the variable resistor 120 and the signal (VM, Q) which has passed through the variable capacitor 130 have a feature that they are orthogonal to each other.

In the vector modulator 100 according to the embodiment of the present invention, it is possible to control the amplitudes of the two signals by controlling the magnitudes of the variable resistor 120 and the variable capacitor 130 respectively. In the summing circuit 140, the two signals are summed, so that the replica signal of the transmission leakage signal of the transmitter 210 can be generated. The output signal of vector modulator 100 may be the summed signal from the summing circuit 140. The summed signal is provided to the receiver 220 and can be used to remove the transmission leakage signal. Here, the output signal of the vector modulator 100 may be in the form of a voltage or a current.

Figure 4:
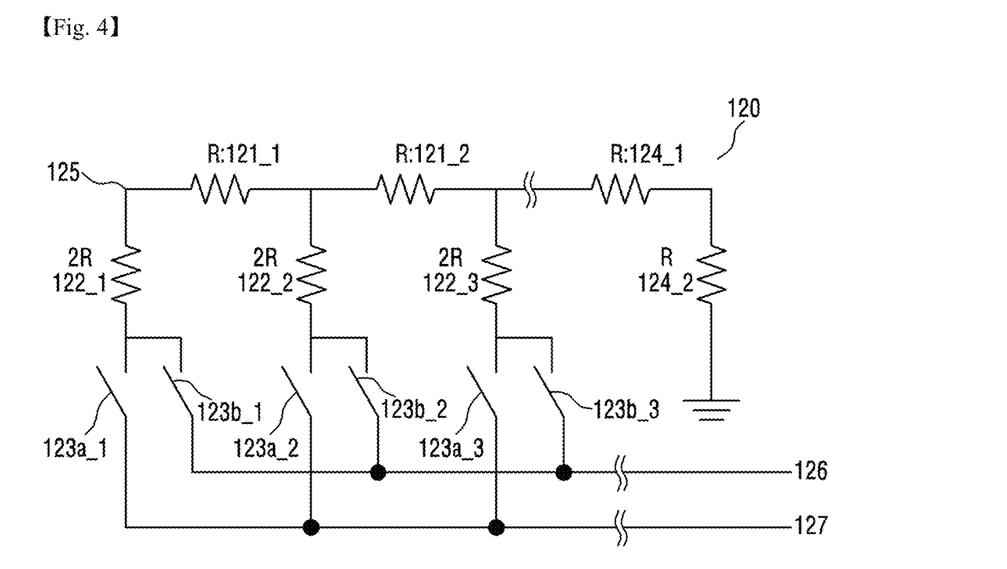
FIG. 4 shows a variable resistor which is included in the vector modulator according to the embodiment of the present invention.
Figure 5:
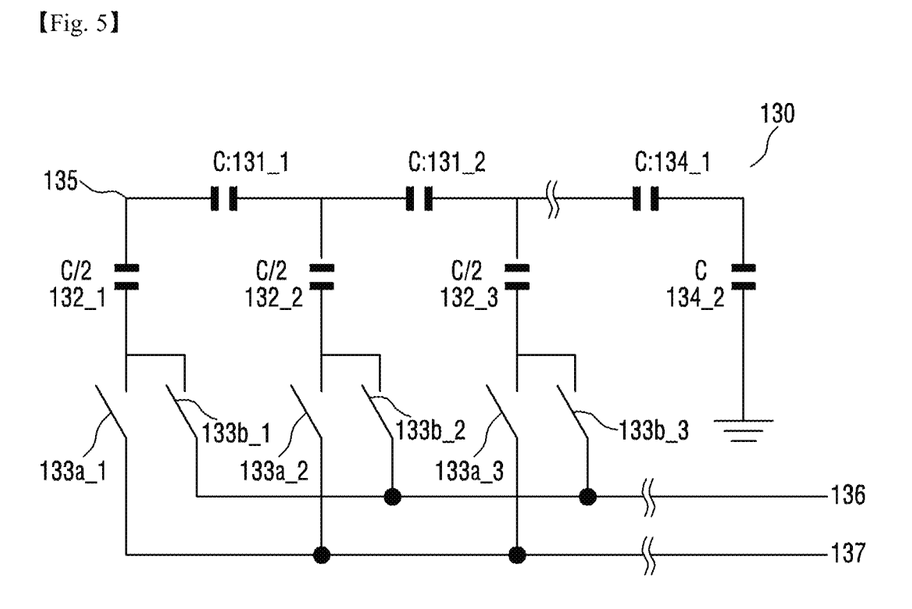
FIG. 5 shows a variable capacitor which is included in the vector modulator according to the embodiment of the present invention.

Each of the variable resistor 120 and the variable capacitor 130 which are included in the vector modulator 100 according to the embodiment of the present invention may be implemented in the form which allows its own value to be controlled. Here, the control of the values of the variable resistor 120 and the variable capacitor 130 can be made through analog or digital control. FIGS. 4 and 5 show a structure capable of easily controlling the magnitudes of the variable resistor 120 and the variable capacitor 130. However, this is just an example. According to the embodiment, the variable resistor 120 and the variable capacitor 130 which have other forms can be used.

FIG. 4 shows the variable resistor 120 which is included in the vector modulator 100 according to the embodiment of the present invention. As shown in FIG. 4, the variable resistor 120 according to the embodiment of the present invention may be formed in the structure of R-2R ladder. For example, the signal which is input to the vector modulator 100 may be input to a portion indicated by a reference numeral 125 of the variable resistor 120 formed in the structure of R-2R ladder shown in FIG. 4. Here, terminals 126 and 127 may be all output nodes. In this case, one may be used as a (+) terminal and the other may be used as a (−) terminal. Also, only one of the terminals 126 and 127 may be used as the output node and the other may be connected to the ground, so that a single output can be obtained.

For example, the R-2R ladder structured variable resistor 120 according to the embodiment of the present invention may further include a trans-impedance amplifier (TIA) (not shown). A signal from the R-2R ladder structure may pass through the TIA and be output. Hereafter, the operation principle of the R-2R ladder structured variable resistor 120 according to the embodiment of the present invention will be briefly described by assuming a virtual ground where the terminal 127 is connected to the ground and the terminal 126 is connected to the negative input terminal of the TIA.

In FIG. 4, two switches 123a and 123b consisting of a pair with each other may be operated such that one switch is an on-state and the other switch is an off-state at a time. That is, the two switches 123a_1 and 123b_1 may be complementarily on/off controlled. The remaining switch pairs may be operated in the same manner. Here, when the switch 123a becomes an on-state, the signal flowing through the switch 123a is discarded through the ground connected to the node 127. When the switch 123b becomes an on-state, the signal flowing through the switch 123b may be connected to the negative input terminal of the TIA connected to the node 126. Here, the value of the current which is input to the TIA through the switch 123b can be represented by the following equation (1).

$$I_{VM,I} = V_{TX}\left(\frac{1}{2R}\times b1 + \frac{1}{4R}\times b2 + \frac{1}{8R}\times b3 + \dots\right) \quad \text{equation (1)}$$

In equation (1), when the switch 123b_1 is an on-state, "b1" multiplied to the term "½R" has a value of 1, and when the switch 123b_1 is an off-state, "b1" has a value of 0. Likewise, when a switch 123b_2 is an on-state, "b2" multiplied to the term "¼R" has a value of 1, and when the switch 123b_2 is an off-state, "b2" has a value of 0. This can be similarly applied to the remaining terms. That is, "bi' has a value of 1 when the switch 123b_i is an on-state, and "bi' has a value of 0 when the switch 123b_i is an off-state.

Here, the amplitude of the signal $I_{VM,I}$ which has passed through the variable resistor 120 can be calculated as $I_{VM,I}=V_{TX}*(1/R)*D/Dmax$. In equation (1), the output current $I_{VM,I}$ of the variable resistor 120 has a value obtained by multiplying the first term of $V_{TX}/R$ by the second term of $$\left(\frac{1}{2}b1 + \frac{1}{2^2}b2 + \frac{1}{2^3}b3 + \dots\right).$$

It can be seen that when the number of the switch pairs is N, the second term is in the form of $k/2^N$. Here, "k" has a value within a range between 1 to $2^N-1$ in accordance with the one and off of each of the switches 123b and Dmax has a value of $2^N$. As such, for the amplitude of the signal $I_{VM, I}$ necessary for the removal of the transmission leakage signal of the transmitter 210, the value of "k" is changed by controlling the on and off of each of the switches 123, so that the value of the variable resistor 120 can be controlled.

FIG. 5 shows the variable capacitor 130 which is included in the vector modulator 100 according to the embodiment of the present invention. With the exception of the replacement of the resistor "R" with the capacitor "C", the operation principle of the variable capacitor 130 is similar to the operation principle of the variable resistor 120 which has already been described with reference to FIG. 4, and thus, repetitive descriptions will be omitted hereafter. As shown in FIG. 5, the variable capacitor 130 according to the embodiment of the present invention may be formed in the structure of C-2C ladder. For example, the signal which is input to the vector modulator 100 may be input to a portion indicated by a reference numeral 135 of the variable capacitor 130 formed in the structure of C-2C ladder. Here, two switches 133a and 133b consisting of a pair with each other may be operated such that one switch is an on-state and the other switch is an off-state at a time.

Here, the amplitude of the signal $I_{VM, Q}$ which has passed through the variable capacitor 130 may be calculated as $I_{VM, Q} = V_{TX} * (j\omega k) * D/Dmax$. Here, when the number of the switch pairs is N, D/Dmax is likewise in the form of $k/2^N$. It can be seen that "k" has a value within a range between 1 and $2^N - 1$ in accordance with the on and off of each of the switches 133b and Dmax has a value of $2^N$. As such, for the amplitude of the signal $I_{VM, Q}$, necessary for the removal of the transmission leakage signal of the transmitter 210, the value of "k" is changed by controlling the on and off of each of the switches 133, so that the value of the variable capacitor 130 can be controlled.

As shown in FIGS. 4 and 5, when the variable resistor 120 and the variable capacitor 130 according to the embodiment of the present invention are formed in the structure of R-2R ladder and in the structure of C-2C ladder respectively, impedance seen as the input terminal of the vector modulator 100 can be maintained constant even though the magnitudes of the variable resistor 120 and the variable capacitor 130 are changed by the operation of the switches 123 and 133. Therefore, this is advantageous for impedance matching.

More specifically, when the R-2R ladder structure is used according to the embodiment of the present invention, the resistor appearing as the input terminal of the vector modulator 100 when seen by the transmitter 210 always has a value of R irrespective of the on/off of the switch 123. Also, when the C-2C ladder structure is used according to the embodiment of the present invention, the impedance appearing as the input terminal of the vector modulator 100 when seen by the transmitter 210 always has a value of C irrespective of the on/off of the switch 133. Therefore, the vector modulator 100 including the variable resistor 120 and the variable capacitor 130 which have the ladder structure according to the embodiment of the present invention is used, so that it is advantageous for impedance matching with the transmitter 210. Therefore, even when the magnitudes of the variable resistor 120 and the variable capacitor 130 are controlled, the impedance of the vector modulator 100 viewed from the transmitter 210 is the same. Accordingly, the output of the transmitter 210 is prevented from being unnecessarily changed, thereby making it possible to efficiently use power.

The vector modulator 100 according to the embodiment of the present invention may include the summing circuit 140. Here, the summing circuit 140 is implemented to sum the first signal which has passed through the variable resistor 120 and the second signal which has passed through the variable capacitor 130. Here, the summing circuit 140 can add the first signal and second signal or can subtract them. Here, the summing circuit 140 may be implemented such that the first and second signals can be added and subtracted in the form of a current of a voltage. For example, the summing circuit 140 may be configured by using the superposition of the voltage, which uses a passive device, or by using the trans-impedance amplifier. Also, the summing circuit 140 may be used by being merged in the form of an RF amplifier of the input terminal of the receiver 220, for example, a low noise amplifier (LNA).

In the transceiver 400 including the vector modulator 100 according to the embodiment of the present invention, a method for removing the transmission leakage signal is performed by the following process: a control signal generated by the receiver 220 of the transceiver 400 in accordance with the transmission leakage signal is transmitted to the vector modulator 100, and the values of the variable resistor 120 and the variable capacitor 130 included in the vector modulator 100 are controlled according to the control signal, so that the transmission leakage signal is removed. The control signal may be transmitted from any position within the receiver 220 or the output terminal of the receiver 220 to the vector modulator 100. In other words, the vector modulator 100 is caused to automatically generate the replica signal of the transmission leakage signal in accordance with the change of the transmission leakage signal of the transmitter 210, which is input to the receiver 220, so that the transmission leakage signal can be also removed.

Figure 6:
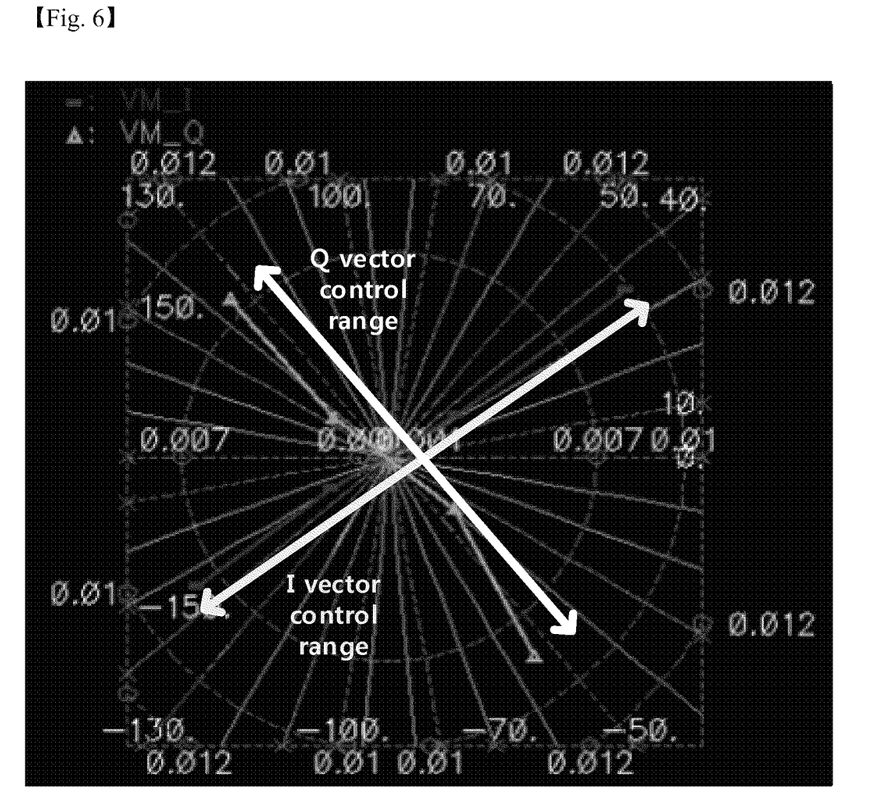
FIG. 6 shows two orthogonal signals which are generated from the vector modulator according to the embodiment of the present invention.

FIG. 6 shows two orthogonal signals which are generated from the vector modulator according to the embodiment of the present invention. In FIG. 6, it can be found that the first signal (indicated by VM_I) and the second signal (indicated by VM_Q) are orthogonal to each other with a phase difference of 90°. FIG. 6 shows a change range of the vector magnitude of the first signal and a change range of the vector magnitude of the second signal. As such, the vector magnitudes of the first and second signals are controlled respectively by using the vector modulator 100 according to the embodiment of the present invention, so that the required summing signal can be finally generated.

Figure 7:
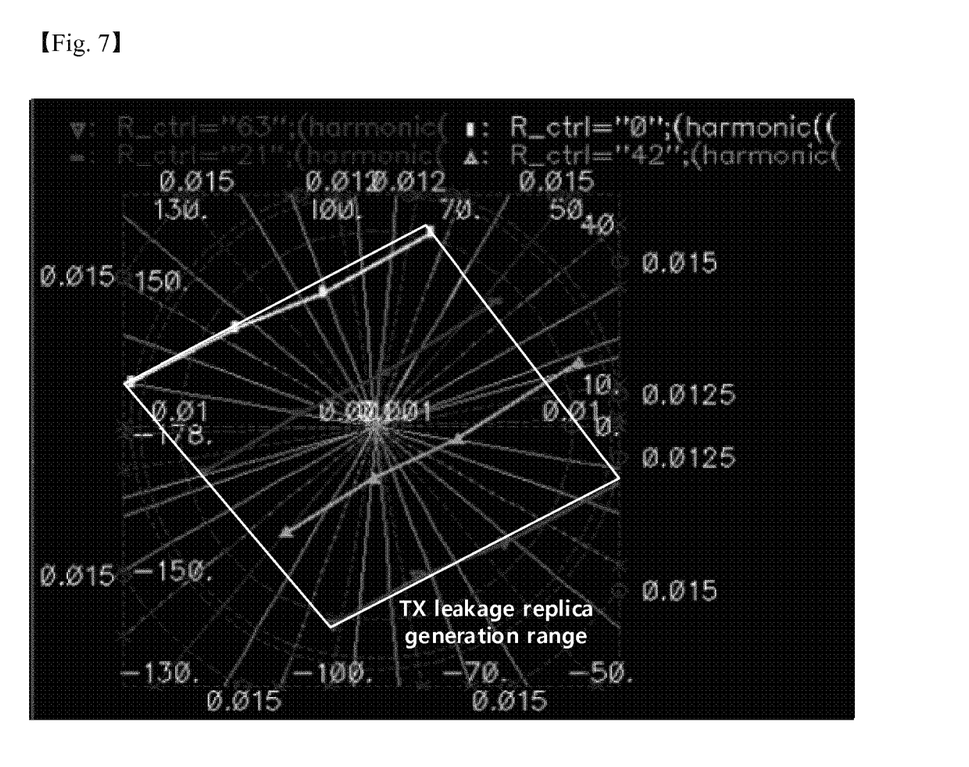
FIG. 7 shows an offset range of the transmitter leakage signal through the vector modulator according to the embodiment of the present invention.

FIG. 7 shows an offset range of the transmitter leakage signal through the vector modulator 100 according to the embodiment of the present invention. In a case where the transmission leakage signal is represented by a vector (represented by the amplitude and phase), when the transmission leakage signal is indicated within an oblique-lined triangle of FIG. 7, the corresponding transmission leakage signal can be offsetted by the vector modulator 100 according to the embodiment of the present invention. The simulation of FIG. 7 shows that all of the transmission leakage signals having the maximum amplitude of +10 dBm and a phase of 0 to 360° are included in the offset range through the vector modulator 100 according to the embodiment of the present invention. Here, the offsetable amplitude may be increased or decreased according to the embodiment and design.

As described above, through use of the vector modulator 100 according to the embodiment of the present invention and the transceiver 400 including the same, it is possible to easily remove the transmission leakage signal of the transmitter 210, which is input to the receiver 220. Also, according to the embodiment of the present invention, it is possible to solve the problem that the reception performance of the receiver 220 is limited by the transmission leakage signal of the transmitter 210, which is input to the receiver 220. For example, it is possible to solve the saturation of the RF block included in the receiver 220, degradation of the SNR of the receiver due to the phase noise of the transmitter, degradation of the sensitivity performance of the receiver due to the DC offset, etc. Furthermore, according to the embodiment of the present invention, since the vector modulator 100 is configured only by using the passive device, problems caused by the active device can be overcome. For example, the vector modulator 100 can be implemented without saturation due to the processing of the relatively large signal caused by the use of the active device, a flicker noise up-conversion, degradation of a common mode rejection ratio (CMRR), a design problem like common noise at the output terminal, etc. Also, the increase of power consumption due to the use of the active device can be prevented. Also, according to the embodiment of the present invention, the variable resistor 120 and the variable capacitor 130 which are included in the vector modulator 100 are implemented in the structures of R-2R ladder and C-2C ladder. Therefore, even when the values of the variable resistor 120 and the variable capacitor 130 are changed, the input impedance is maintained constant, so that it is advantageous for impedance matching.

While the embodiment of the present invention has been described with reference to the accompanying drawings, it can be understood by those skilled in the art that the present invention can be embodied in other specific forms without departing from its spirit or essential characteristics. Therefore, the foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A vector modulator of a transceiver, the vector modulator comprising:
 a variable resistor having a first end to which an input signal is transmitted and a second end;
 a variable capacitor which is connected in parallel to the variable resistor and has a first end to which the input signal is transmitted and a second end; and
 a summing circuit configured to sum a first signal from the second end of the variable resistor and a second signal from the second end of the variable capacitor, wherein the first signal and the second signal have a 90 degree phase difference; and
 wherein a value of the variable resistor and a value of the variable capacitor are controlled according to a transmission leakage signal of a transmitter of the transceiver, which is input to a receiver of the transceiver, such that an amplitude and a phase of the output signal from the summing circuit are, respectively, equal to an amplitude and a phase of the transmission leakage signal.

2. The vector modulator of claim 1, wherein the variable resistor has an R-2R ladder structure.

3. The vector modulator of claim 1, wherein the variable capacitor has a C-2C ladder structure.

4. The vector modulator of claim 1, wherein the input signal is a transmitting signal of the transmitter of the transceiver.

5. The vector modulator of claim 1, wherein the output signal of the summing circuit is input to the receiver of the transceiver.

6. A transceiver comprising:
 a transmitter configured to generate a transmitting signal;
 a receiver configured to receive a data signal through an antenna; and
 a vector modulator comprising:
  a variable resistor having a first end to which the transmitting signal is transmitted and a second end;
  a variable capacitor which is connected in parallel to the variable resistor and has a first end to which the transmitting signal is transmitted and a second end; and
  a summing circuit configured to sum a first signal and a second signal, wherein the first signal is a signal of the second end of the variable resistor and the second signal is a signal of the second end of the variable capacitor, and the first signal and the second signal have a 90 degree phase difference, and
 wherein the vector modulator is configured to:
  receive the transmitting signal,
  generate the first signal and the second signal,
  control amplitudes of the first and second signals based on a leakage signal of the transmitting signal such that an amplitude and a phase of an output signal from the summing circuit are, respectively, equal to an amplitude and a phase of the leakage signal of the transmitting signal, and
  output the output signal from the summing circuit for offsetting the leakage signal via input to the receiver.

7. The transceiver of claim 6, wherein the variable resistor has an R-2R ladder structure.

8. The transceiver of claim 6, wherein the variable capacitor has a C-2C ladder structure.

9. The transceiver of claim 6, wherein a value of the variable resistor and a value of the variable capacitor are controlled according to the leakage signal of the transmitting signal, which is input to the receiver.

10. The vector modulator of claim 1, wherein the value of the variable resistor and the value of the variable capacitor are controlled according to the transmission leakage signal of the transmitter of the transceiver based on a control signal output by the receiver.

11. The vector modulator of claim 10, wherein the variable resistor has an R-2R ladder structure including switches, and the control signal controls the value of the variable resistor by controlling the switches.

12. The transceiver of claim 6, wherein the vector modulator is configured to control amplitudes of the first and second signals based on a leakage signal of the transmitting signal by controlling a value of the resistor and a value of the capacitor, based on a control signal receiving from the receiver.

13. The transceiver of claim 12, wherein the variable capacitor has a C-2C ladder structure including switches, and the control signal controls the value of the variable capacitor by controlling the switches.

* * * * *